United States Patent [19]

Shatzman et al.

[11] Patent Number: 5,270,459
[45] Date of Patent: Dec. 14, 1993

[54] METHOD FOR PRODUCING DISPERSIBLE XANTHAN GUM PRODUCTS

[76] Inventors: Howard M. Shatzman, 3803 Drexel Ct., Louisville, Ky. 40241; Thomas G. Scacco, 211 Prestwick Pl., Louisville, Ky. 40243; Martha A. Davies, 302 Eline Ave., Louisville, Ky. 40207

[21] Appl. No.: 883,628

[22] Filed: May 13, 1992

[51] Int. Cl.$^5$ .............................................. C08B 37/00
[52] U.S. Cl. .................................... 536/114; 536/124; 106/205; 106/206; 106/208; 514/54
[58] Field of Search ................... 514/54; 536/114, 124; 106/205, 206, 208

[56] References Cited

U.S. PATENT DOCUMENTS

| | | | |
|---|---|---|---|
| 3,146,200 | 8/1964 | Goldstein et al. | 536/114 |
| 4,041,234 | 8/1977 | Maske | 536/114 |
| 4,254,257 | 3/1981 | Schroeck | 536/114 |
| 4,260,741 | 4/1981 | Schuppner | 536/114 |
| 4,269,974 | 5/1981 | Wintersdorff | 536/114 |
| 4,299,825 | 11/1981 | Lee . | |
| 4,363,669 | 12/1982 | Cottrell et al. | 536/114 |
| 4,874,854 | 10/1989 | Colegrove et al. | 536/114 |

Primary Examiner—Ronald W. Griffin

[57] ABSTRACT

A method for producing a dispersible xanthan gum product comprising the steps of:
  (a) adding base to xanthan gum particles to increase the pH of the particles to between about 7 and about 9.5;
  (b) reacting the base with the xanthan gum particles for a time period sufficient to allow the base to fully penetrate the xanthan gum particles;
  (c) adding glyoxal to said basic xanthan gum particles;
  (d) maintaining said reactants for a period of time sufficient to allow the glyoxal to homogeneously permeate the xanthan gum particles; and
  (e) adding acid to said reactants to enable the formation of hemiacetal linkages between the glyoxal and the xanthan gum particles;

and the product produced thereby is disclosed.

17 Claims, No Drawings

METHOD FOR PRODUCING DISPERSIBLE XANTHAN GUM PRODUCTS

BACKGROUND TO THE INVENTION:

1. Field of the Invention

The present invention relates to a method for producing a dispersible xanthan gum product. More specifically, the method comprises the addition of glyoxal to xanthan gum under alkaline conditions, followed by treating the resulting product with acid to form the hemiacetal linkages between the xanthan gum and glyoxal. The resulting product more uniformly distributes the glyoxal across the xanthan gum particles. In addition, the product can be designed with a specifically controlled hydration rate profile and has improved age stability.

2. Technology Description

Xanthan gum is an excellent and widely used suspending and viscosity building agent. Some of its particular uses are in oil well fluids, paints, sprays and cleaning fluids. Xanthan gum however has few disadvantages. It is very difficult to disperse and wet in water or brine so that hydration can take place. A high degree of shear is usually necessary to wet each gum particle. Once dispersal and wetting are accomplished the hydration of the gum, as evidenced by the development of viscosity, is quite rapid.

U.S. Pat. No. 4,041,234 discloses dispersible glyoxal-xanthan gum complexes. According to the patent, in a preferred mode, glyoxal is added to a xanthan gum fermentation broth for the purpose of improving the dispersibility of the xanthan gum. Alternative methods proposed comprise mulling xanthan gum and glyoxal in a mortar with enough water to effect reaction or to spray an aqueous solution of glyoxal onto tumbling xanthan gum particles followed by drying the resulting material. The reference further discloses that the reaction between the xanthan gum and glyoxal can take place at a pH of up to 8. The reference does not teach nor suggest that the xanthan gum be treated with a base prior to the glyoxal addition, holding the mixture under basic conditions for a time period sufficient to enable the glyoxal to homogeneously permeate the xanthan gum particles and adding acid after the glyoxal has permeated the xanthan gum particles. As a result, high amounts of glyoxal are required to adequately disperse the resulting material when added to an aqueous solution.

SUMMARY OF THE INVENTION

In accordance with the present invention, an improved dry process for producing dispersible xanthan gum products is provided. The process comprises the steps of:

(a) adding base to xanthan gum particles to increase the pH of the particles to between about 7 and about 9.5;

(b) reacting the base with the xanthan gum particles for a time period sufficient to allow the base to fully penetrate the xanthan gum particles;

(c) adding glyoxal to said basic xanthan gum particles;

(d) maintaining said reactants for a period of time sufficient to allow the glyoxal to homogeneously permeate the xanthan gum particles; and (e) adding acid or acid salt to said reactants to enable the formation of hemiacetal linkages between the glyoxal and the xanthan gum particles.

By utilizing the above process, a product may be produced which:

(i) requires a minimal amount of glyoxal to provide dispersibility to the xanthan gum;

(ii) can have specifically tailored hydration properties;

(iii) retains its hydration properties for extended periods of time; and (iv) does not require a drying step.

In accordance with another embodiment of the present invention, the product produced by the above process is provided.

Accordingly, it is an object of the present invention to provide an improved process for producing dispersible xanthan gum products.

It is a further object of the present invention to provide a dispersible xanthan gum product which contains a minimal amount of glyoxal and has specifically tailored hydration properties for enhanced periods of time.

These, and other objects will readily be apparent to those skilled in the art as reference is made to the detailed description of the preferred embodiment.

DETAILED DESCRIPTION OF THE PREFERRED EMBODIMENT

When describing the preferred embodiment, certain terminology will be utilized for the sake of clarity. Such terminology is intended to encompass the recited embodiment, as well as all technical equivalents which operate in a similar manner for a similar purpose to achieve a similar result.

To initiate the process of the present invention, xanthan gum particles are provided. Typically, xanthan gum is obtained from the fermentation product produced by the action of the bacteria *Xanthomonas campestris* upon carbohydrates. A discussion on the production of xanthan gum from a fermentation broth is provided in U.S. Pat. Nos. 4,041,234 and 4,299,825. To the extent necessary, these references are hereby incorporated by reference. Once the xanthan gum has been produced from fermentation broth, it is typically separated from the broth, washed, and dried.

Once dry xanthan gum particles have been obtained, the pH of the particles is raised to between about 7 and about 9.5 by the addition of any suitable base. In practice, xanthan gum particles not treated with base typically have a pH of about 6 to 7. Non-limiting examples of suitable xanthan gum particles useful in the present invention are sold under the trade names Rhodopol 23P and Rhodopol 23 by Rhône-Poulenc Inc.

In practice, sodium carbonate in water is used to increase the pH of the xanthan gum particles. As a general rule, for each 0.1% of sodium carbonate added per weight of xanthan gum, the pH of the particles increase by 0.3–0.4 units. Other bases may be selected to increase the pH of the xanthan gum particles. Examples of such bases include but are not limited to NaOH, $NH_4OH$, $(NH_4)_2CO_3$ and the like.

In the preferred embodiment the pH of the base treated xanthan gum particles typically ranges from about 7.2 to about 8.6. The reaction typically takes place at ambient conditions, ranging from about 70° F. to about 140° F.

Once the base has been added, it is allowed to react with the xanthan gum particles for a period of time sufficient to allow complete penetration to the xanthan gum particles. Typical reaction times in the preferred embodiment range from about 10 minutes to about 2 hours, with a range of about 30 minutes to about 60 minutes being especially preferred.

Thereafter a solution of glyoxal is applied to the base treated xanthan gum particles. In practice, the amount of pure glyoxal comprises from about 0.15 to about 1.0 parts per 100 parts xanthan gum particles.

In the preferred embodiment, the glyoxal is applied to the base treated xanthan gum particles by means known in the art, such as mulling, and, more preferably, by utilizing a fluid spray from a nozzle. In practice, the temperature of the addition of the glyoxal solution to the xanthan gum particles takes place at a range between about 70° F. and about 140° F., with the proviso that the temperature should not exceed 140° F. If the temperature of the mixture exceeds 140° F., cooling water should be provided to ensure a temperature below 140° F.

In the preferred embodiment, along with the glyoxal, a diluent may be added to aid in the distribution of the glyoxal to the xanthan gum particles and to assist in alleviating the need for a final drying step. Examples of diluents which are preferred according to this miscible invention include, but are not limited to diethylene glycol ether, ethylene glycol, water, other water miscible solvents and mixtures thereof. A suitable diluent is Carbitol LG, sold by Union Carbide.

It is at this point in the invention that the effect of the base addition to the xanthan gum particles is particularly pronounced. In prior art systems wherein the xanthan gum particles have not been treated with a base, upon addition of glyoxal to the particles, an immediate reaction occurs between the xanthan gum particles and the glyoxal, formed by the creation of hemi-acetal linkages between the reactants. This reaction tends to occur very rapidly and, as a result, the glyoxal does not uniformly distribute across the xanthan gum particles. Therefore, it is very difficult to disperse the resulting material unless glyoxal is added in large amounts. By stark comparison, according to the present invention, because the xanthan gum particles have been treated with base, the glyoxal does not immediately react with the particles. This is particularly advantageous because the glyoxal can be evenly distributed and homogeneously permeated throughout the xanthan particles prior to the formation of the hemi-acetal bonds.

Once the glyoxal, and, optionally, diluent materials, have been added to the base treated xanthan gum particles, the reactants are maintained for a period of time sufficient to allow the glyoxal to homogeneously permeate the xanthan gum particles. This holding time typically ranges from about 10 minutes to about 2 hours, with a range of about 30 minutes to about 60 minutes being especially preferred.

In still another preferred embodiment, the addition of glyoxal to the xanthan gum particles may take place repeatedly. For example, one half of the total glyoxal additive, optionally including one or more diluents, is added to the xanthan gum particles and then maintained for a period of time sufficient to allow the glyoxal to permeate, but not react with, the xanthan gum particles. Thereafter the other half of the glyoxal solution may be added to the base treated xanthan gum particles.

Once the glyoxal solution has been applied to the xanthan gum particles, and allowed to sufficiently permeate the particles, an acid or acid salt is added to the mixture to cause formation of the hemi-acetal linkages between the glyoxal and the xanthan gum particles. Prior to addition of the acid or acid salt to the particles, what is produced is a complex wherein the glyoxal is uniformly permeated throughout the xanthan gum particles, but will not react with the particles. This provides improved dispersibility to the resulting materials. as the glyoxal will be more uniformly dispersed throughout the xanthan gum particles than in prior art procedures.

Further, because of the uniform distribution of glyoxal to the particles, a lesser amount of glyoxal may be utilized to produce a readily dispersible xanthan gum product. For example, by utilizing the inventive process, the amounts of glyoxal used may be decreased by a factor of up to 85% versus a procedure which does not utilize base treatment of xanthan gum particles.

Literature with respect to glyoxal suggests that if glyoxal is added to a material having a pH of greater than 7, the glyoxal will hydrolyze via a Cannizaro reaction to form glycolic acid. The inventors have surprisingly discovered that the glyoxal may be added to basic xanthan gum particles (pH>7) without being hydrolyzed to a significant degree. Rather, the glyoxal will uniformly permeate the xanthan gum particles. The subsequent addition of acid or acid salt then allows the glyoxal to react with the xanthan gum particles and thereby enable the production of a dispersible xanthan gum product.

In practice, any of a number of acids or acid salts may be added, including sodium diacetate and acetic acid, with sodium diacetate being particularly preferred. Other weak organic acids such as formic acid may alternatively be selected. The amount of acid or acid salt added to the mixture is such that the final product will have a pH ranging between about 6.0 and about 8.0. In the case of sodium diacetate as the acid salt, this typically comprises adding between about 0.2 to about 1.3 parts of sodium diacetate per 100 parts xanthan gum particles.

In accordance with the present invention, by carefully monitoring the pH of the xanthan gum particles, particularly with respect to the amount of acid or acid salt subsequently added to the particles, the hydration rate profile of the resulting material can be specifically tailored. For example, a lower finished product pH typically tends to lower the overall hydration rate of the resulting particles. Similarly, raising the pH of the finished dispersible xanthan gum particles ultimately increases the hydration rate of the particles. In practice, a 30 to 40 centipoise (cp) change is noted in the viscosity of a 100 part aqueous solution (0.00003% $CaCl_2$) having added therein 0.3 parts of the product of the present invention for a thirty (30) minute time period per 0.1 pH unit of the resulting product. Thus, specifically desired dispersible xanthan gum particles can be developed in accordance with this invention.

A further advantage of the particles produced by the present invention is that they can demonstrate a similar hydration rate profile for extended periods of time. In general, when glyoxal is added to xanthan gum particles, the types of linkages which may occur are the formation of hemi-acetal bonds, and the formation of full acetal bonds. For purposes of dispersing the xanthan gum particles, it is particularly preferred that the bond formation be of the hemi-acetal variety. As discussed above, by using the base/acid treatment according to the present invention, far less glyoxal is provided to the xanthan gum particles. As a result, there is a much high likelihood that a majority of the bond formations will be of the hemi-acetal variety. Without using the present invention, because higher amounts of glyoxal are required, a larger percentage of full acetal bonds may be formed. The presence of such linkages negatively impacts the desired hydration rate performance of the resulting material. In practice, by utilizing the process of the present invention, it has been discovered that the resulting particles show a very similar hydration rate behavior for a period of up to 60 days.

The above process yields a finished product which is ready for dispersing without requiring an additional drying step. Drying is not required because this process is a "dry" process and because the process itself is sufficient to generate enough heat to reduce the moisture content of the final particles.

The invention is described greater detail by the following non-limiting examples.

COMPARATIVE EXAMPLE 1

1 part of glyoxal from a 40% solution, 3 parts of water and 3 parts of Carbitol LG, a diluent sold by Union Carbide are added to 100 parts of Rhodopol 23P, commercially available xanthan gum particles manufactured by Rhône-Poulenc Inc. The pH of the resulting particles is 6.57.

0.3 parts of this material is added to 100 parts of a 0.00003% $CaCl_2$ aqueous solution. The particles do not disperse in the solution; a number of lumps in the solution are noted. As a result, the particles do not uniformly hydrate and thicken the solution. Accordingly, a hydration rate profile for this product can not be obtained.

EXAMPLE 1

To 100 parts of Rhodopol 23P, commercially available xanthan gum particles manufactured by Rhône-Poulenc Inc., are added 3.0 parts water and 0.365 parts sodium carbonate at a temperature of 125° F. Application of the water and sodium carbonate mixture to the gum is provided by spraying the water in sodium carbonate mixture over a 45 to 55 minute period of time. When the spraying is complete this material is mixed for 30 minutes. The pH of this mixture is 8.6. Thereafter, a mixture of 2.0 parts water, 1.5 parts Carbitol LG, and 0.5 parts pure glyoxal (from a 40% solution) are sprayed onto the xanthan gum particles for a 50-60 minute period at a temperature of 125° F. This batch is held under these conditions for about one hour. Thereafter, 2.0 parts water, 1.5 parts Carbitol LG, and 0.5 parts pure glyoxal (40% solution) are sprayed onto the gum over a 50-60 minute period at a temperature of 130° F. This mixture is allowed to mix for 30 minutes. Thereafter, 0.65 parts of anhydrous sodium diacetate are added to the mixture. This material is mixed for 30 minutes to produce the final particles. The pH of the particles is 6.4.

To determine the hydration rate profile for this xanthan gum material, 0.3 parts of the product are added to 100 parts of a 0.00003% $CaCl_2$ solution. The viscosity of the solution is measured at time intervals after addition to the solution as set forth in the attached table. The xanthan gum particles are effectively dispersed throughout the solution.

14 days later, 0.3 parts of the compound produced in Example 1 are added to 100 parts of 0.00003% $CaCl_2$ solution. The viscosity of the solution is measured at time intervals as set forth in the attached table. The particles effectively disperse throughout the $CaCl_2$ solution. The same test is repeated 28 days after the product is made. Then particles effectively disperse throughout the $CaCl_2$ solution. The data from this test is also shown in the attached table.

| HYDRATION RATE STUDY FOR EXAMPLE 1 | | | |
|---|---|---|---|
| Time | Immediately after synthesis | 14 days later | 28 days later |
| 30 minutes | 138 cp | 140 cp | 135 cp |
| 45 minutes | 300 cp | 248 cp | 258 cp |
| 2 hours | 550 cp | 455 cp | 475 cp |
| 24 hours | 587 cp | 590 cp | 595 cp |
| pH | 6.4 | 6.48 | not measured |

EXAMPLE 2

The procedure of Example 1 is repeated except that the amount of water added along with the glyoxal is 1.5 parts per addition and that the amount of sodium diacetate added is 0.8 parts. The resulting particles effectively thicken and disperse an aqueous solution.

Having described the invention in detail and by reference to the preferred embodiments thereof, it would be apparent that modifications and variations are possible without departing from the scope of the appended claims.

What is claimed is:

1. A method for producing a dispersible xanthan gum product comprising the steps of:
   (a) adding base to xanthan gum particles to increase the pH of the particles to between about 7 and about 9.5;
   (b) reacting the base with the xanthan gum particles for a time period sufficient to allow the base to fully penetrate the xanthan gum particles;
   (c) adding glyoxal to said basic xanthan gum particles;
   (d) maintaining said reactants for a period of time sufficient to allow the glyoxal to homogeneously permeate the xanthan gum particles; and
   (e) adding acid or an acid salt to said reactants to enable the formation of hemiacetal linkages between the glyoxal and the xanthan gum particles.

2. The method according to claim 1 wherein said pH of step (a) is between about 7.2 and about 8.6.

3. The method according to claim 1 wherein said base added in step (a) is sodium carbonate.

4. The method according to claim 1 wherein the time period of step (b) ranges from about 10 minutes to about 2 hours.

5. The method according to claim 1 wherein the time period in step (d) ranges from about 10 minutes to about 2 hours.

6. The method according to claim 1 wherein the acid or acid salt added in step (e) is selected from the group consisting of formic acid, sodium diacetate and acetic acid.

7. The method according to claim 6 wherein said acid is sodium diacetate.

8. The method according to claim 7 wherein steps (c) and (d) are repeated prior to step (e).

9. The method according to claim 1 wherein no drying step is utilized to isolate the final product.

10. The method according to claim 1 comprising the additional step of adding a diluent along with the addition of glyoxal in Step (c).

11. The method according to claim 10 wherein said diluent is selected from the group consisting of diethylene glycol ether, ethylene glycol, water miscible solvents, water, and mixtures thereof.

12. The method according to claim 1 wherein the amount of glyoxal added in step (c) comprises between about 0.15 to about 1.0 parts per 100 parts xanthan gum particles.

13. A method for producing a dispersible xanthan gum product comprising the steps of:
   (a) adding sodium carbonate to xanthan gum particles to increase the pH of the particles to between about 7 and about 9.5;
   (b) reacting the sodium carbonate with the xanthan gum particles for a time period ranging from about 10 minutes to about 2 hours;
   (c) adding glyoxal to said basic xanthan gum particles;
   (d) maintaining said reactants for a time period ranging between about 10 minutes and about 2 hours to enable the glyoxal to homogeneously permeate the xanthan gum particles; and
   (e) adding sodium diacetate to said reactants to enable the formation of hemiacetal linkages between the glyoxal and the xanthan gum particles.

14. The method according to claim 13 wherein steps (c) and (d) are repeated prior to step (e).

15. The method according to claim 13 comprising the additional step of adding a diluent along with the addition of glyoxal in step (c).

16. The product produced by:
   (a) adding base to xanthan gum particles to increase the pH of the particles to between about 7 and about 9.5;
   (b) reacting the base with the xanthan gum particles for a time period sufficient to allow the base to fully penetrate the xanthan gum particles;
   (c) adding glyoxal to said basic xanthan gum particles;
   (d) maintaining said reactants for a period of time sufficient to allow the glyoxal to homogeneously permeate the xanthan gum particles; and
   (e) adding acid or an acid salt to said reactants to enable the formation of hemiacetal linkages between the glyoxal and the xanthan gum particles.

17. The product according to claim 16 having a pH ranging between about 6 and about 8.

* * * * *